(12) United States Patent
Yang et al.

(10) Patent No.: US 8,837,769 B2
(45) Date of Patent: Sep. 16, 2014

(54) VIDEO SIGNATURE BASED ON IMAGE HASHING AND SHOT DETECTION

(75) Inventors: Lei Yang, Gainesville, FL (US); Qian Chen, Gainesville, FL (US); Jun Tian, Bell Mead, NJ (US); Dapeng Oliver Wu, Gainesville, FL (US); Hong Heather Yu, West Windsor, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 33 days.

(21) Appl. No.: 13/098,042

(22) Filed: Apr. 29, 2011

(65) Prior Publication Data

US 2012/0087583 A1   Apr. 12, 2012

Related U.S. Application Data

(60) Provisional application No. 61/390,311, filed on Oct. 6, 2010.

(51) Int. Cl.
*G06K 9/00* (2006.01)
*G06K 9/62* (2006.01)
*G06F 17/30* (2006.01)

(52) U.S. Cl.
CPC ...... *G06F 17/30799* (2013.01); *G06K 9/00744* (2013.01)
USPC .......................................... 382/100; 382/224

(58) Field of Classification Search
None
See application file for complete search history.

(56) References Cited

U.S. PATENT DOCUMENTS

2007/0268966 A1* 11/2007 Kim .................... 375/240.08
2011/0069939 A1* 3/2011 Choi et al. .................. 386/278

FOREIGN PATENT DOCUMENTS

WO   WO 2008049851 A2 *  5/2008  ............... G06K 9/00

OTHER PUBLICATIONS

Kim et al., "A Novel Approach to Video Sequence Matching Using Color and Edge Features with the Modified Hausdorff Distance", Proceedings of the 2004 International Symposium on Circuits and Systems, vol. 2, May 26, 2004, pp. 57-60.*
Venkatesan et al., "Robust Image Hashing", 2000 International Conference on Image Processing, vol. 3, pp. 664-666.*
Roover et al., "Robust Video Hashing Based on Radial Projections of Key Frames", IEEE Transactions on Signal Processing, vol. 53, No. 10, Oct. 2005, pp. 4020-4037.*
IEEE Citations for "A Novel Approach to Video Sequence Matching Using Color and Edge Features with the Modified Hausdorff Distance" and "Robust Image Hashing",2 pages.*
Dunn, J.C., "A Fuzzy Relative of the ISODATA Process and its Use in Detecting Compact Well-Separated Clusters," Cybernetics and Systems, 3: 3, 1973, pp. 32-37.
Bezdek, J.C., "Pattern Recognition with Fuzzy Objective Algorithms," 1981, 7 pages, Kluwer Academic Publishers, Norwell, MA.

(Continued)

*Primary Examiner* — Jason M Repko
*Assistant Examiner* — Ryan P Potts
(74) *Attorney, Agent, or Firm* — Slater & Matsil, L.L.P.

(57) ABSTRACT

In accordance with an embodiment, a method of comparing a first group of frames to a second group of frames includes electronically receiving the first group of frames, selecting a group of frames from the first group of frames as a first key frame set, calculating a hash distance between an image hash for each frame in the first key frame set to an image hash of each frame of a second key frame set taken from second group of frames, and choosing frames in the first group of frames with a minimum hash distances to respective reference frames to form a series of minimum hash distances.

15 Claims, 3 Drawing Sheets

(56) References Cited

OTHER PUBLICATIONS

Kautsky, J., et al., "Feature Point Detection in Blurred Images," Image and Vision Computing, International Conference, IVCNZ' 1998, 7 pages.

Bhattacharjee, S.K., et al., "End-Stopped Wavelets for Detecting Low-Level Features," Proc. SPIE, Wavelet Applications in Signal and Image Processing VII, 1999, 10 pages.

Monga, V., "Perceptually Based Methods for Robust Image Hashing," Dissertation, University of Texas, Austin, Aug. 2005, 120 pages.

* cited by examiner

VIDEO SIGNATURE BASED ON IMAGE HASHING AND SHOT DETECTION

This application claims the benefit of U.S. Provisional Application No. 61/390,311, filed on Oct. 6, 2010, entitled "Video Signature based on Image Hashing and Shot Detection," which application is hereby incorporated herein by reference.

TECHNICAL FIELD

The present invention relates to image processing, and, in particular embodiments, to a video signature based on image hashing and shot detection.

BACKGROUND

The significant growth of the World Wide Web and improvements in the speed and bandwidth of telecommunication systems has led to a growth of the availability and transfer of videos. Due to the vast amount of information available, processes for identifying similar videos may be desirable. For example, a service provider may want to determine whether one video file is similar another video file. One method to do this is to use video signature schemes.

Current video signature schemes are divided into two categories. In one category, a single key frame is selected to represent a shot, and an image hash is taken of the single key frame to be used as a shot signature. The first category takes advantage of the image hash, of which the solution is well developed. However, one key frame from a shot may not sufficiently represent a whole shot, since temporal information is not used in deriving video signature.

In the second category, temporal information is used to derive video hash. Here, a 3D transform is generally performed, the coefficients of which are used as a video signature. The second category usually requires pre-processing to unify the whole video sequence in spatial and temporal scale before the 3D transform is performed. If the sequence is long, however, the sequence is subsampled, and useful temporal information is lost. Consequently, the derived signature may not be a good representative for the whole video.

SUMMARY OF THE INVENTION

In accordance with an embodiment, a method of comparing a first group of frames to a second group of frames includes electronically receiving the first group of frames, selecting a group of frames from the first group of frames as a first key frame set, calculating a hash distance between an image hash for each frame in the first key frame set to an image hash of each frame of a second key frame set taken from second group of frames, and choosing frames in the first group of frames with a minimum hash distance to respective reference frames to form a series of minimum hash distances.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

An increasing number of multimedia applications demand efficient and automatic techniques to identify and verify the video content. Video signature emerges as a promising technique to solve this problem. In embodiments of this invention, a perceptual video signature based on image hashing and video shot detection is disclosed. The video is cut into sequences of video shots, and the key frames of shots are generated. In some embodiments a local histogram is used to divide the sequences into shots, however, shot detection can be accomplished using other method known in the art. Image hashing is applied to each key frame and combined into video hash.

Embodiments of the present invention have applications in video retrieval, video authentication and so on. The video signature can identify video in shot levels, and also estimate the possible transform or attack of the query video.

A method for video signature based on image hashing and shot detection is also disclosed. In one embodiment, the method detects whether two video sequences are of the same/similar content. The video sequence is segmented to shots, and a key frame or key frame set is identified. A video signature is defined as an image hash of these key frames.

A brief description of a first embodiment video signature method will now be provided. A group of frames is selected as a key frame set to represent the shot. A regional histogram difference method is used to select the key frame set. The image hash is then calculated for each frame in the set. For a video shot in reference video and a shot in suspected video, the hash distance between the two key frame sets is compared. The frame in the suspected shot with minimum distance is chosen as the counterpart of the frame in reference shot, and the maximum of the series of the distances, denoted as Hausdorff distance, is chosen as the distance between the two shots. If the distance is below a certain threshold, the two shots can be considered similar shots.

Figure 1:
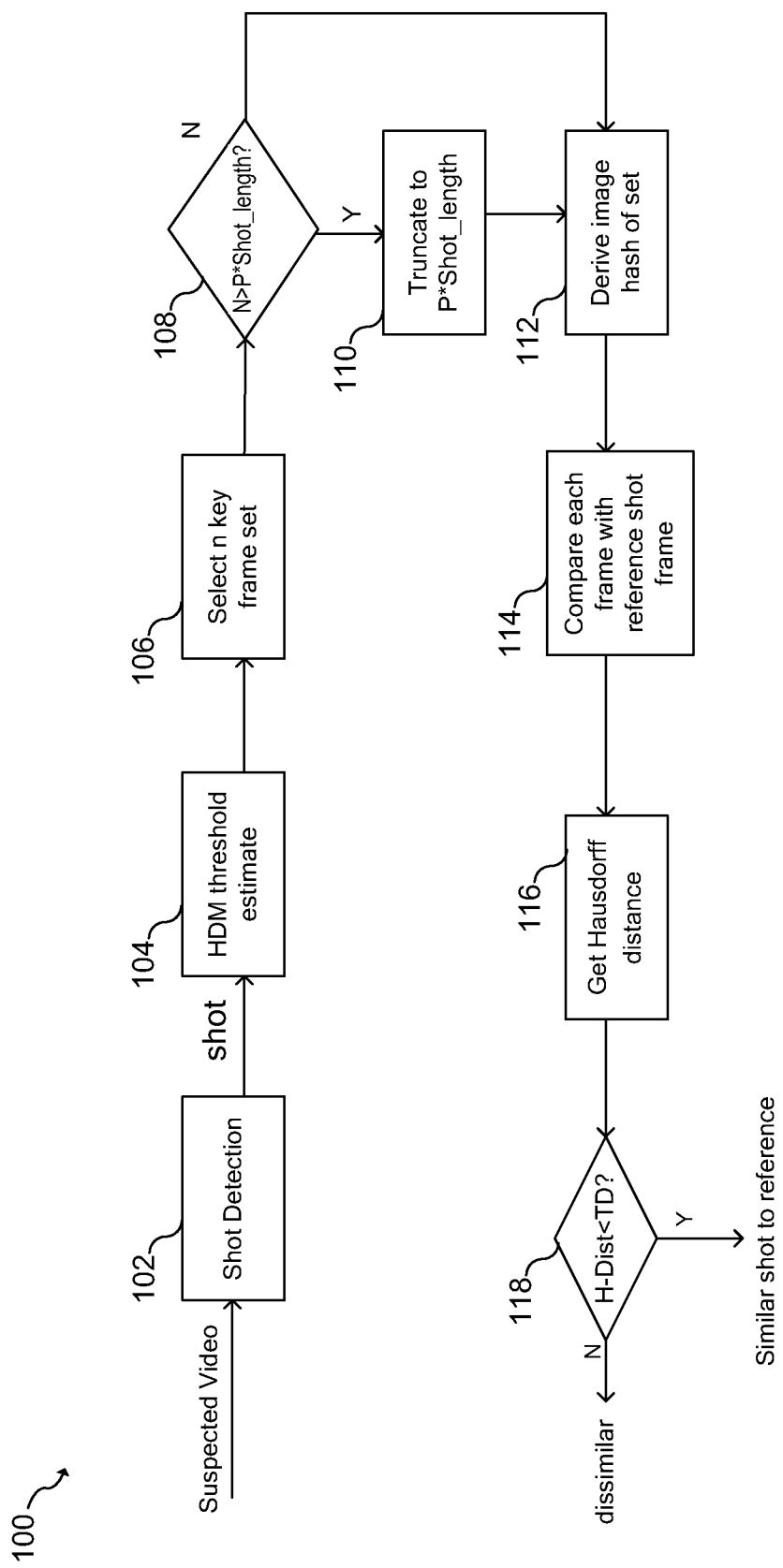
FIG. 1 provides a diagram of embodiment video comparison method.

A block diagram illustrating an embodiment video signature method is shown in FIG. 1. The input is a suspected video sequence, or a video sequence that is to be compared to a reference shot and/or a reference video sequence. First, the video is segmented into shots in step 102. Shot detection methods known in the art can be employed here, for example, histogram/intense based methods, edges/contours based methods, SIFT feature based methods, etc. In some embodiments, the detected shot boundary is determined accurately so that a selected key frame set more precisely represents the shot.

Given the segmented shot, the mean and variance of Histogram Difference Measure (HDM) of each shot is estimated in step 104. In an embodiment, a mean+p*standard_deviation is used as the threshold in to select key frame set for this shot, initially with p=0, where p represents a parameter to control how many frames are being selected as key frames. Next, a Regional Histogram Difference (RHD) method is employed to select a series of key frames, called Key Frame Set for each shot using the threshold set before. Essentially, the HDM method is used to determine how different a present frame is from a number of previous frames.

Using an embodiment Regional Histogram Difference (RHD) algorithm, the first frame in the shot is taken as a key frame and as an initial reference frame. Next, each frame is divided into 16 smaller blocks. For every block, the histogram difference between the current block and co-located block in the previous frame is calculated. If the histogram difference is above a threshold TH, the block is counted. When the 16 blocks are finished, if the count number is above another threshold value TH2, the current frame is selected as a key frame and set as a reference frame. In an embodiment, TH is between about 0.4 and about 0.6, and TH2 is between about 12 and about 14. Alternatively, other values for TH and TH2 can be used depending on the particular application and its specifications. In some embodiments, an adaptive threshold is used to select members of the key frame set. It should be appreciated that when implementing embodiment RHD algorithms, each frame can be divided into greater or fewer sub blocks besides 16. In alternative embodiments, other methods besides RHD, for example, SIFT feature based methods can be used in step 104.

The above mentioned RHD procedure is applied to the whole shot such that all of the selected key frames form a Key Frame Set for the shot (step 106). In some cases, however, it is desirable to further control the length of the Key Frame set. In one embodiment, a number P*shot_length is preset as the largest number of key frames allowable for each shot. If the length of Key Frame Set is above this value (step 108), the set length is truncated to this value by taking the first P*shot_length key frames with the largest RHD value (step 110). Parameter P can be chosen taking into account the desired computational complexity and/or the video type. For example, a relatively static video type, such as a talk show or a lecture can used a lower P than an active video type such as an action movie. In one example embodiment, P=0.2, such that the total number of key frames selected is no larger than 20% of the whole shot length. In another example embodiment, P=0.1, such that the total number of key frames selected is no larger than 10% of the whole shot length. Alternatively, other values for P can be selected. In some embodiments, optional steps 108 and 110 can be omitted.

Figure 2:
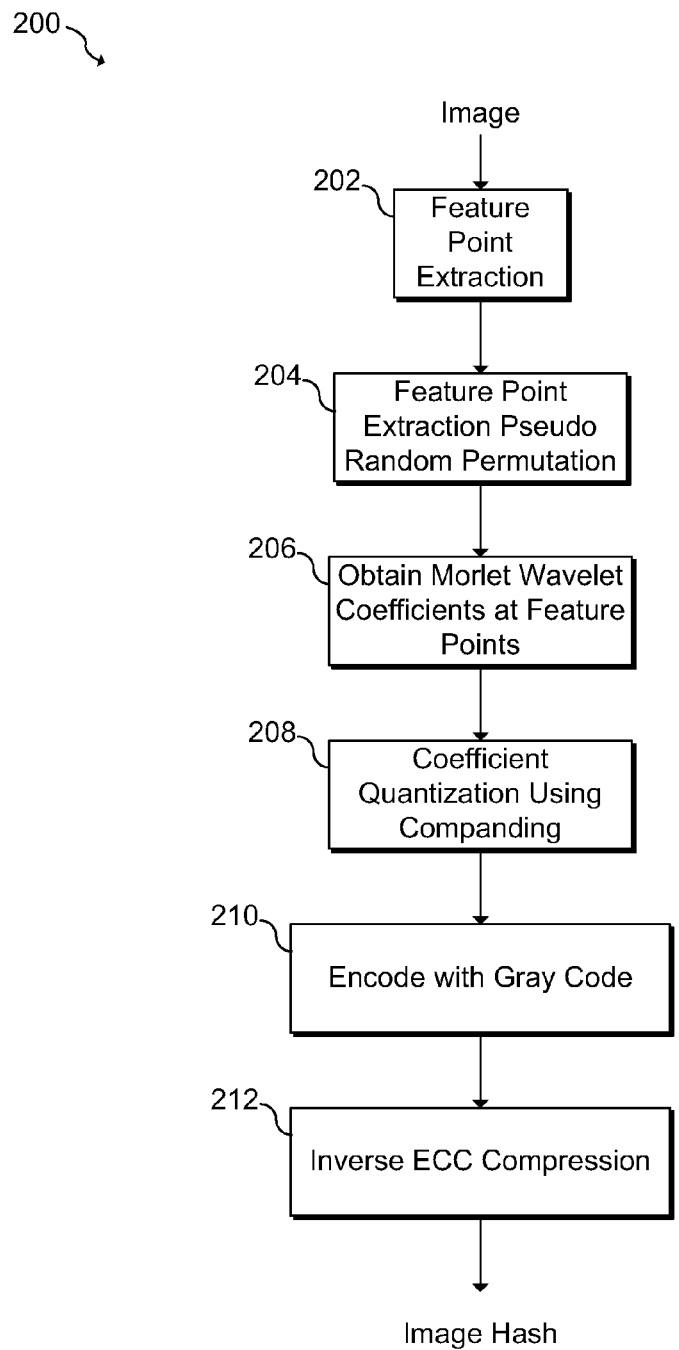
FIG. 2 illustrates an embodiment image hashing generation method.

Next, for each key frame in Key Frame Set, its image hash is generated in step 112 according to embodiment hash generation method 200 shown in FIG. 2. In an embodiment, methods described in application Ser. No. 12/892,148 entitled, "System and Method for Image Authentication," filed on Sep. 28, 2010, which application is incorporated by reference herein in its entirety, are used to generate the image hash.

First, the feature points of the key frames are generated in step 202. Feature points are geometric descriptors of the contents of key frames that are more robust to geometric attacks than other statistics based descriptors. They are also useful for video registration and identifying possible underlying geometrical or non-geometrical attacks. In one embodiment, a Klette's feature point extraction algorithm is used. This algorithm is described in *Feature Point Detection in Blurred Images*, by R. Klette et. al, Image and Vision Computing International Conference, 1998, which is incorporated herein by reference in its entirely. Klette's feature point extraction algorithm selects points that are in between two edges with an angle from the interval $$\left[\frac{\pi}{2} - d_a, \frac{\pi}{2} + d_a\right]$$

in between regardless of its orientation, even when images are compressed, filtered, blurred or noisy. Alternatively, other algorithms can be used, for example, a Harris corner detection algorithm.

In an embodiment, the parameters used for the feature point extraction algorithm are chosen based on experimentation and/or methods described, for example in *Perceptually Based Methods for Robust Image Hashing*, by Vishal Monga, Thesis, Dept. of Electrical and Computer Engineering, The University of Texas at Austin, Austin, Tex. 78712, August 2005, which is incorporated herein by reference in its entirety. In an embodiment, the number of feature points is 64, the mean computation size is 4, the sign change size is 1, the distance to straight lines is 7, the angle difference allowance is 3, and the minimal distance between feature points is 8. In alternative embodiments, other parameters can be used.

Next, in step 204, a pseudo random permutation of the feature points is performed. In one embodiment, the pseudo random permutation is performed by re-ordering the two-dimensional feature points into a one-dimensional feature point list, and then performing a pseudo-random permutation of the one-dimensional list. In some embodiments, these feature points are pseudo-randomly permutated using a secret key determined by the users to increase the security of the generated hashing.

In step 206, Morlet Wavelet coefficients are calculated for the feature points. In one embodiment, the 2D Morlet wavelet is defined as:

$$\varphi_M(\vec{x}) = \left(e^{i\vec{k_0}\cdot\vec{x}} - e^{-\frac{1}{2}|\vec{k_0}|^2}\right)e^{-\frac{1}{2}|\vec{x}|^2}, \qquad (8)$$

where $\vec{x}=(x_1,x_2)$ represents the 2D spatial coordinates, and $\vec{k_{0o}}=(k_1,k_2)$ is the wave-vector of the mother wavelet, which respectively determines the scale-resolving power and angular resolving power of the wavelet. In an embodiment, Morlet wavelets are used to detect linear structures perpendicular to the orientation of the wavelet. Alternatively, other transform coefficients can be used besides Morlet wavelet coefficients.

In step 208, to obtain the binary sequence from the float Morlet wavelet coefficients of feature points, the Morlet Wavelet coefficients are quantized and optionally companded. While, some embodiments using companding can be made more computationally robust and efficient implantation than solutions using vector quantization, embodiments employing vector quantization can still be used. The quantization levels are chosen based on the magnitudes of the Morlet wavelet coefficients. Quantization using companding can binarize the sequence as well as simplify the representation of hash with saved bits. In one embodiment, 16 quantization levels are used. Alternatively, a different number of quantization levels can be used.

The quantized coefficients are then optionally encoded using a Gray Code in step 210, which shortens the hamming distance between neighboring codes. In some cases, Gray Code of hash is more suitable for hamming distance, which will shorten the distance between adjacent hashes, but enlarge the distance between hashes that are far away. Furthermore, an optional inverse ECC compression, such as Viterbi decoding is performed in step 212. The security of the hash can be further enhanced by making the quantization and compression stages key dependent. Encryption could be inserted before and after quantization step 208 and compression step 212. It should be appreciated that hashing methods other than the methods described above can be used for example, low frequency magnitude based methods.

In an embodiment, the output of the image hash is a fixed length vector (usually binary alphabet $\{0, 1\}$). One goal of the scheme is to detect whether the suspected video sequence is similar to the reference video sequence. Hence, in some embodiments, the reference video is already segmented into shots. In an embodiment, the image hash is computed for key frames in each Key Frame Set and stored in memory.

It should be appreciated that, in embodiments, hashed key frames for the reference video can be derived using embodiment steps 102 to 112 described hereinabove. In some embodiments, hashed key frames of reference video shots can be stored locally on a server for later comparison and/or derived on an as needed basis.

Turning back to FIG. 1, a shot-by-shot comparison is performed between suspected video and reference video to make a decision in steps 114 and 116. For any given shot in the suspected video, the distance is computed between a key frame in suspected shot and its counterpart in a reference shot. Here, a Euclidean distance can be used for a non-binary image hash vector, and a Hamming distance can be used for a binary image hash vector. Other distance measures such as a $1^p$ norm can be employed here.

In one example, there are M frames in a suspected shot, and N frames in the reference shot. For the first key frame in the suspected shot, N distance values are determined and a minimum distance is chosen for the frame similarity measure. For the second key frame, the same procedure is performed but the start frame in the reference set is set as the one with minimum distance to the first frame in the suspected set. That is, a causal time constraint is imposed when searching for the minimum distance reference frame. Finally, a minimum distance vector with less or equal to the M-tuple is determined, since some key frames in the suspected set may not find its minimum distance counterpart in the reference set due to the time constraint. The maximum of this distance vector is then chosen as the distance between these two shots. It is noted that the distance selection procedure stated above is an equivalent Hausdorff Distance measure (step 116). Therefore, the proposed comparison procedure can be referred to as a Hausdorff distance comparison based video hash. Alternatively, other distance measures can be used besides the Hausdorff measure, such as a Euclidean distance or a Hamming distance.

The Hausdorff Distance determined by step 116 is then compared to a threshold TD in step 118 to determine whether in the suspected shot is similar or dissimilar to the reference shot. In one embodiment the shots are considered similar if the Hausdorff Distance is less than a threshold. In some embodiments, threshold TD is optimized to reduce false negatives and false positives depending on the application and it requirements. For example, TD can be iteratively tuned using training sequences. Further, the magnitude of TD can vary according to the particular application. In an embodiment, TD is between about 0.45 and about 0.50. Alternatively, other values outside of this range can be used.

In an embodiment, magnitude of the Hausdorff Distance determined by step 116 provides a measure of similarity and dissimilarity between the suspected shot and the reference shot. For example, if the distance between these two shots is very small, for example, less than 0.05, there is a very high confidence that the two shots are similar. If, for example, the distance is, 20, it can be said with high confidence that these two shots are not similar. It should be appreciated that the Hausdorff Distance examples of 0.05 and 20 are just illustrative examples, as distances and their confidence levels can vary across embodiments and implementations.

In embodiments, the way in which videos are deemed similar can be determined based on the particular application. For example, in copyright violation detection applications, thresholds and decision points can be set such that two videos are deemed similar even if only a small proportion of the shots in the suspect video are similar to reference shots. In other applications, videos can be deemed to be dissimilar even if the shots are "similar" but not identical.

Furthermore, even if the video content in the suspected video is actually similar to that in the reference, they may be displayed in different order due to intentional or unintentional manipulation to the reference video. Hence, in one embodiment, all shots in the reference video are evaluated and one of minimum Hausdorff distance is selected as its counterpart shot for the current shot in suspected video. If such Hausdorff distance between the suspected shot and its counterpart in reference is below a certain threshold, they may be considered "similar shots."

In one embodiment, a video signature method includes selecting a group of frames as a key frame set to represent a suspected shot, calculating an image hash for each frame in the set, comparing a hash distance between respective frames in the key frame set that represents the suspected shot and a key frame sets that represents a video shot in a reference video, choosing a frame in the suspected shot with minimum distance as a counterpart of a frame in reference shot; and choosing a maximum of a series of the distances as a distance between the two shots. In some embodiments, the method further includes determining that the suspected shot and the reference shot are similar shots if the distance is below a certain threshold. In one embodiment, choosing the maximum of the series of the distances as the distance between the two shots comprises choosing a Hausdorff distance. In a further embodiment, a regional histogram difference method is used to select the key frame set.

Figure 3:
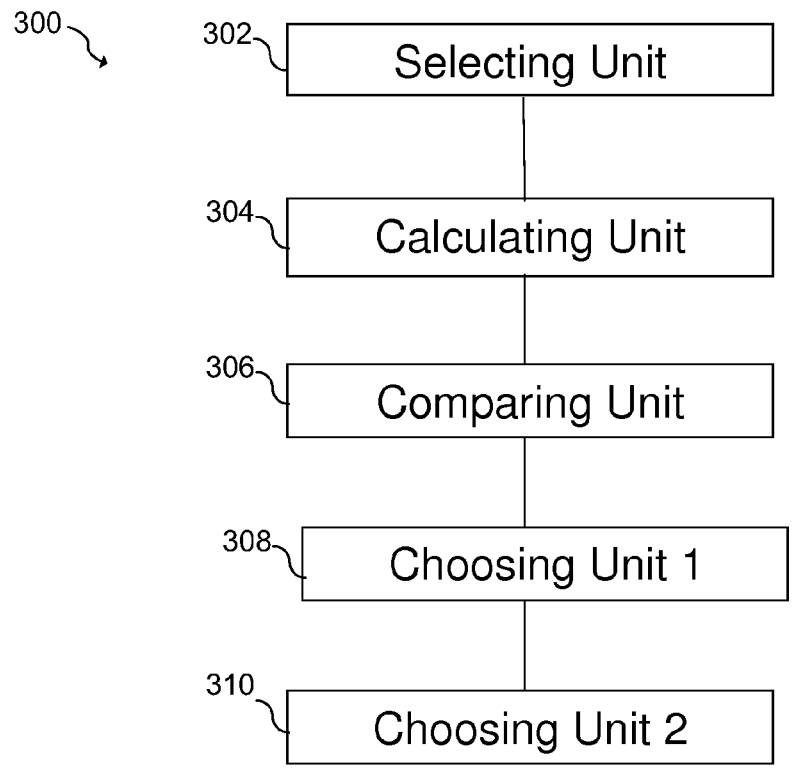
FIG. 3 illustrates a system for implementing one specific embodiment of the present invention.

The video signature method described hereinabove can be implemented in a system 300 as shown in FIG. 3. Referring to that figure, selecting unit 302 is configured to select a group of frames as a key frame set to represent a suspected shot. Calculating unit 304 is configured to calculate an image hash for each frame in the key frame set. Comparison unit 306 is configured to compare a hash distance between respective frames in the key frame set that represents the suspected shot and a key frame set that represents a video shot in a reference video. First choosing unit 308 is configured to choose a frame in the suspected shot with minimum distance as a counterpart of a frame in reference shot, and second choosing unit 310 is configured to choose a maximum of a series of the distances as a distance between the two shots.

Figure 4:
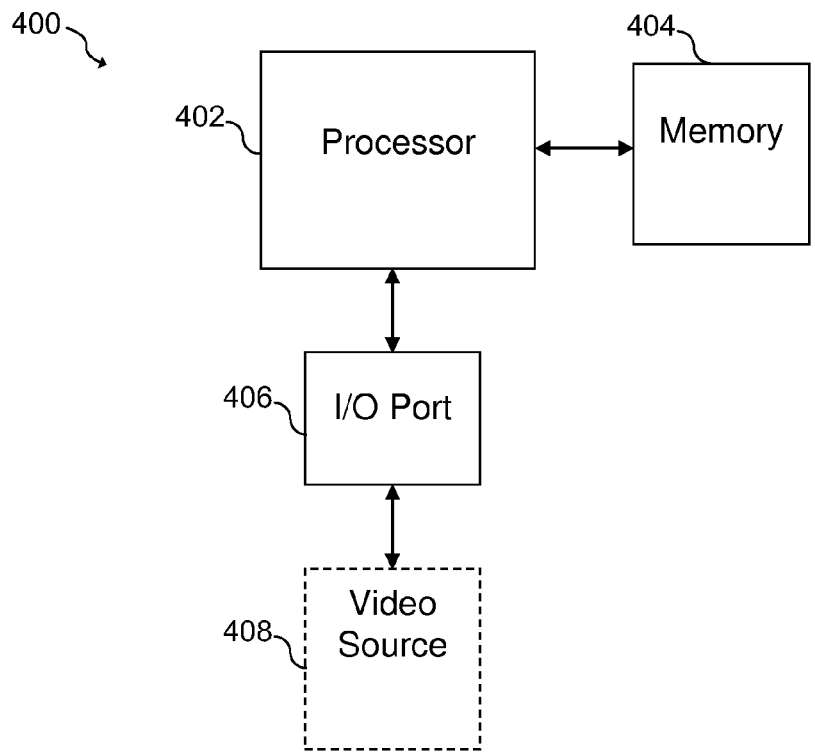
FIG. 4 illustrates a processing system that can be used with various embodiments of the invention.

FIG. 4 illustrates a processing system 400 that can be utilized to implement methods of the present invention. In this case, the main processing is performed in by processor 402, which can be a microprocessor, digital signal processor or any other appropriate processing device. Program code (e.g., the code implementing the algorithms disclosed above) and data can be stored in memory 404. The memory can be local memory such as DRAM or mass storage such as a hard drive, optical drive or other storage (which may be local or remote). While the memory is illustrated functionally with a single block, it is understood that one or more hardware blocks can be used to implement this function.

In one embodiment, the processor can be used to implement various some or all of the units shown in FIG. 3. For example, the processor can serve as a specific functional unit at different times to implement the subtasks involved in performing the techniques of the present invention. Alternatively, different hardware blocks (e.g., the same as or different than the processor) can be used to perform different functions. In other embodiments, some subtasks are performed by the processor while others are performed using a separate circuitry.

FIG. 4 also illustrates I/O port 406, which can be used to provide the video to and from the processor. Video source 408, the destination of which is not explicitly shown, is illustrated in dashed lines to indicate that it is not necessary part of the system. For example, the source can be linked to the system by a network such as the Internet or by local interfaces (e.g., a USB or LAN interface).

Embodiment methods can be applied, for example, for content filtering tools. For example, a news organization or an online video sharing website can compare candidate videos that are being uploaded to hashed reference video sequences contained in a database. Based on this comparison, the news organization or online video sharing website can determine whether to accept or reject the video.

A number of new features and advantages can be derived from various aspects and embodiments of the present invention. For example, in some embodiments, a key frame can be represented almost uniquely by it hash. Furthermore, some implementations of embodiment hash system and methods can detect the originality of the video as well as its shots, rather than only detecting the originality of the video.

Further advantages include the ability to make a comparison between two videos in cases where a similarity between two video sequences is not defined. In such cases a decision on the similarity of the content can be made at a shot level.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of comparing a source video shot to a reference video shot, the method comprising:
   electronically receiving a first group of frames corresponding to the source video shot;
   selecting a sub-set of frames from the first group of frames as a first key frame set, wherein the sub-set of frames includes two or more different frames from the source video shot;
   selecting a second key frame set from a second group of frames corresponding to a reference video shot;
   identifying multiple pairs of counterpart frames for comparing the source video shot to the reference video shot, wherein each pair of counterpart frames includes one source frame from the first key frame set and one reference frame from the second key frame set;
   calculating a hash distance for each pair of counterpart frames to obtain a plurality of hash distances between source frames of the source video shot and reference frames of the reference video shot;
   selecting a maximum hash distance in the plurality of hash distances as a Hausdorff distance for comparing the source video shot to the reference video shot, the maximum hash distance being a distance between an image hash in a source frame and a reference frame of a single pair of counterpart frames; and
   determining that the source video shot is similar to the reference video shot when the Hausdorff distance is below a predetermined threshold.

2. The method of claim 1, wherein selecting the sub-set of frames from the first group of frames comprises selecting the sub-set of frames using a regional histogram difference of the first group of frames.

3. The method of claim 2, wherein selecting the sub-set of frames further comprises truncating results of the regional histogram difference when a number of selected frames is greater than a predetermined number.

4. The method of claim 3, further comprising selecting the predetermined number in accordance with a video type associated with the first group of frames.

5. The method of claim 1, further comprising calculating an image hash for each frame in the first key frame set.

6. The method of claim 5, wherein calculating an image hash comprises:
   extracting feature points of the each frame of the first key frame set;
   performing a pseudorandom permutation of the feature points to produce permuted feature points;
   calculating transform coefficients of the permuted feature points; and
   hashing the transform coefficients.

7. The method of claim 1, further comprising partitioning the source video shot from a source video.

8. The method of claim 1, wherein the plurality of hash distances include at least a first hash distance and a second hash distance, the first hash distance and the second hash distance corresponding to different source frames in the source video shot.

9. A method of determining whether a source video shot is similar to a reference video shot, the method comprising:
   electronically receiving a first group of frames corresponding to the source video shot;
   selecting a sub-set of frames from the first group of frames as a first key frame set, wherein the sub-set of frames includes two or more different frames from the source video shot;
   selecting a second key frame set from a second group of frames corresponding to the reference video shot;
   identifying multiple pairs of counterpart frames for comparing the source video shot to the reference video shot, wherein each pair of counterpart frames includes one source frame from the first key frame set and one reference frame from the second key frame set;
   calculating a hashing distance for each pair of counterpart frames to obtain a plurality of hash distances, wherein each hashing distance comprises a distance between an image hash in a source frame and the image hash in a reference frame of the respective pair of counterpart frames;

determining that a maximum hashing distance in the plurality of hashing distances is a Hausdorff distance for comparing the source video shot to the reference video shot; and determining that the source video shot is similar to the reference video shot when the Hausdorff distance is below a threshold.

10. The method of claim 9, further comprising partitioning the source video shot from a video sequence.

11. The method of claim 9, wherein the plurality of hash distances include at least a first hash distance and a second hash distance, the first hash distance and the second hash distance corresponding to different source frames in the source video shot.

12. An apparatus comprising:
a processor; and
a computer readable storage medium storing programming for execution by the processor, the programming including instructions to:
receive a first group of frames corresponding to a source video shot;
select a first key frame set from the first group of frames, wherein the first key frame set includes two or more different frames from the source video shot;
select a second key frame set from a second group of frames corresponding to a reference video shot;
identify multiple pairs of counterpart frames for comparing the source video shot to the reference video shot, wherein each pair of counterpart frames includes one source frame from the first key frame set and one reference frame from the second key frame set;
calculate a hash distance for each pair of counterpart frames to obtain a plurality of hash distances between source frames of the source video shot and reference frames of the reference video shot;
select a maximum hash distance in the plurality of hash distances as a Hausdorff distance for comparing the source video shot to the reference video shot, the maximum hash distance being a distance between an image hash in a source frame and a reference frame of a single pair of counterpart frames; and
determine that the source video shot is similar to the reference video shot when the Hausdorff distance is below a threshold.

13. The apparatus of claim 12, wherein the plurality of hash distances include at least a first hash distance and a second hash distance, the first hash distance and the second hash distance corresponding to different source frames in the source video shot.

14. A non-transitory computer readable medium with an executable program stored thereon, wherein the executable program includes instructions to:
receive a first group of frames corresponding to a source video shot;
select a first key frame set from the first group of frames, wherein the first key frame set includes two or more different frames from the source video shot;
select a second key frame set from a second group of frames corresponding to a reference video shot;
identify multiple pairs of counterpart frames for comparing the source video shot to the reference video shot, wherein each pair of counterpart frames includes one source frame from the first key frame set and one reference frame from the second key frame set;
calculate a hash distance for each pair of counterpart frames to obtain a plurality of hash distances between source frames of the source video shot and reference frames of the reference video shot;
select a maximum hash distance in the plurality of hash distances as a Hausdorff distance for comparing the source video shot to the reference video shot, the maximum hash distance being a distance between an image hash in a source frame and a reference frame of a single pair of counterpart frames; and
determine that the source video shot is similar to the reference video shot when the Hausdorff distance is below a threshold.

15. The non-transitory computer readable medium of claim 14, wherein the plurality of hash distances include at least a first hash distance and a second hash distance, the first hash distance and the second hash distance corresponding to different source frames in the source video shot.

* * * * *